United States Patent [19]

Joy

[11] Patent Number: 4,886,224

[45] Date of Patent: Dec. 12, 1989

[54] AIRCRAFT LIFT MECHANISM

[76] Inventor: Mario G. Joy, Apdo. Postal 21-005, 04000, Mexico, D.F., Mexico

[21] Appl. No.: 244,414

[22] Filed: Sep. 15, 1988

[51] Int. Cl.$^4$ .............................................. B64C 29/00
[52] U.S. Cl. ................................... 244/23 R; 244/12.1
[58] Field of Search ..................... 244/12.1, 12.2, 12.3, 244/12.5, 23 R, 23 A, 23 B, 23 C, 23 D, 73 B

[56] References Cited

U.S. PATENT DOCUMENTS

| | | | |
|---|---|---|---|
| 3,033,492 | 5/1962 | Rowe | 244/23 |
| 3,034,747 | 5/1962 | Lent | 244/23 |
| 3,088,695 | 5/1963 | Clark | 244/12 |
| 3,335,977 | 8/1967 | Meditz | 244/12 |
| 3,397,853 | 8/1968 | Richardson | 244/23 |
| 4,146,202 | 3/1979 | Pender | 244/209 |
| 4,202,518 | 5/1980 | Burnham et al. | 244/12.1 |
| 4,370,824 | 2/1983 | Resnicow | 244/12.2 |

FOREIGN PATENT DOCUMENTS

| | | | |
|---|---|---|---|
| 1040908 | 10/1958 | Fed. Rep. of Germany | 244/73 B |
| 2242281 | 3/1974 | Fed. Rep. of Germany | |
| 13484 | of 1910 | United Kingdom | 244/73 B |

Primary Examiner—Joseph F. Peters, Jr.
Assistant Examiner—Rodney Corl
Attorney, Agent, or Firm—Harrison & Egbert

[57] ABSTRACT

An apparatus for producing lift in a flying vehicle comprising a top deck of a flying vehicle having a cylindrical well formed thereinto, a discoidal member positioned within the cylindrical well, an air intake system formed in the center of the discoidal member for drawing air through the discoidal member for use elsewhere in the flying vehicle, and a labyrinth member formed on the periphery of the discoidal member for restricting the clearance between the discoidal member and the wall of the cylindrical well. The discoidal member is adapted and powered for rotating within the well. The top deck has a generally flat exterior surface. A fluid passageway extends through the interior of the flying vehicle for passing air from the air intake system. The discoidal member has a flat top surface generally parallel to the top deck of the flying vehicle. The top surface of the discoidal member is positioned within the well below the upper surface of the top deck. A second discoidal member is positioned within the fluid passageway at a location adjacent the bottom of the well. The second discoidal member is coaxial with the first discoidal member and connected by a common spindle. The common spindle is rotatably powered by the prime mover means. The labyrinth comprises of plurality of rimmed cavities positioned so as to be in close proximity with the wall of the well for the first discoidal member and the wall of the fluid passageway for the second discoidal member.

21 Claims, 4 Drawing Sheets

AIRCRAFT LIFT MECHANISM

TECHNICAL FIELD

The present invention relates to propeller systems and lift mechanisms for air craft. More particularly, the present invention relates to vertical/short take off and landing aircraft having suitable propulsion systems.

BACKGROUND ART

The present-day helicopters must have a high ratio of horsepower to gross weights because inherently the lift capability of the rotary wing is low; typically for each horsepower applied less than twenty pounds can be lifted, even with the aid of "ground effect" and at sea level air density, and considerably less at higher altitudes. The net payload and range of helicopters are thus severely limited and their fuel consumption is comparatively high. Conventional fixed-wing airplanes, which carry considerably greater useful loads than helicopters can in relation to the horsepower employed, have, however, other inherent limitations consequent upon their design, such as high landing speeds. While present day aircraft are severely restricted in performance by their necessary dependence upon their relatively fragile wings for support.

U.S. Pat. No. 4,202,518, issued May 13, 1980, describes an "Air-Borne Support and Lift Mechanism Adapted to Aircraft". This invention contemplated a relatively Planiform, normally horizontal upper surface of an aircraft, provided with one or more shallow cylindrical recesses or wells. In each of the wells, a horizontal disc is rotatably mounted. This disc has its spindle coaxial with the well and passes through and extends downwardly below the sealed well bottom. The disc is powered for rotation. The nether surface of the discs are fitted with thin blades near the outer rim to turn with minimum clearance above the sealed horizontal well bottom surface. The upper surface of the disc is flat, domed or flat and may comprise symmetrically and generally radially located cambered convexities. The leading edge of the convexity is rounded but somewhat steeper and shorter than the trailing portion. The assembly of this invention allows the disc to turn at normal speed while a steady upward impulse is transmitted to the aircraft structure. In this invention, for any given horsepower input, the lift produced by the configuration compares favorably with the lift produced by a conventional helicopter rotor driven by equal horsepower.

In this invention, through action or interaction of one or more of various causes, an area of lowered air pressure is created over the configuration and extends over the surrounding top deck of the aircraft. On the under body of the aircraft structure, subjacent to the well, an undisturbed air exerts ambient pressure upward. When the unbalanced upward pressure difference exceeds the downward pull of gravity upon the aircraft, the latter is borne upward; when they are in balance, it hovers; when the unbalanced upward thrust is less than the pull of gravity upon the aircraft, the latter descends. The lift action of this invention is, in general, independent of translational movement of the aircraft. When translational movement is present, the same pressure differences persist. Proper aerodynamic conformation of the aircraft enables it to obtain increasing lift as its translational speed increases.

In U.S. Pat. No. 4,202,518, an alternative embodiment is also specified and designated as "spinlift". This comprises an upper, relatively horizontal, vehicle surface called the top deck. The top deck is provide with one or more shallow cylindrical recesses or wells. In each well, a disc is rotatably mounted. A spindle powers this disc for rotation. The disc has a restricted peripheral clearance within the well. The generally flat nether surface of the disc is fitted with thin blades near the outter rim to turn with minimum clearance above the sealed horizontal well bottom surface. The upper surface of the disc is substantially flat, or uniformly dished, or lense-shaped. The upper surface of the disc is preferably set slightly below the level of the surrounding top deck. Variations in the lift effort generated is regulated at will by the operator of the aircraft through changes and disc rotational speed.

The operation of spin lift mechanism is related to the Bernoulli proposition that a surface in motion, relative to an air mass, experiences reduced pressure. A reduced pressure over the upper surface of rotating disc is opposed by a normal ambient air pressure applied upwardly to the subjacent under body of the aircraft, with a consequent net lift effect. Where the rotating upper surface of the disc is exposed directly to stationary superjacent air, the upward movement is measurable and increases with an increase in the speed of rotation of the disc. The closely and circling wall of the well contributes to an effect containment of pressure difference. Concomitant reduced the pressure in the clearance space between the disc nether surface and the upper surface of the well bottom causes the application of a substantial part of the total lift action as "suction" or differential pressure bearing upward on the aircraft body structure subjacent to the well bottom. This minimizes the spindle load.

In the invention of U.S. Pat. No. 4,202,518, additional forms of motive power were invisioned for the forward thrust of the aircraft. Quite obviously, the spin lift mechanism was intent for the vertical take off and landing of the aircraft. Importantly, however, a mechanism for providing thrust to the aircraft was not described in this apparatus. As such, no mechanism was described for allowing air to pass through the rotating disc into a fluid passageway within the aircraft.

The present invention is a further developmental step in this spin lift mechanisms, and its use on flying vehicles.

It is an object of the present invention to provide an aircraft lift mechanism that causes air to pass to an included turbine.

It is an other object of the present invention to provide an aircraft lift mechanism that preserves the lifting benefits of the spin lift mechanism, while creating proper sealing action within the mechanism.

These and other object and advantages of the present invention will become apparent from a reading of the attached specification and appended claims.

SUMMARY OF THE INVENTION

The present invention is an apparatus for producing lift in a flying vehicle comprising: a top deck of a flying vehicle having a cylindrical well formed thereinto, a discoidal member positioned within the cylindrical well and adapted and powered for rotating within the well, an air intake system formed in the center of the discoidal member for drawing air through the discoidal member for use elsewhere in the flying vehicle, and a labyrinth mechanism formed at the periphery of the discoidal member for restricting the clearance between the discoidal member and the wall of the cylindrical well.

The top deck has a generally flat exterior surface. The cylindrical well is formed in that flat surface area. The fluid passageway extends through the interior of the flying vehicle for passing air from the air intake system. The fluid passageway opens at the bottom of the well and communicates with the air intake system. The fluid passageway is arranged within the flying vehicle so as to transmit the air to a turbine. This turbine is positioned at the end of the fluid passageway opposite the cylindrical well. This turbine is positioned for providing forward thrust to the flying vehicle. The turbine has a longitudinal axis offset by ninety degrees from the axis of the well.

The discoidal member has a flat top surface generally parallel to the top deck of the flying vehicle. The top surface of the discoidal member is positioned within the well slightly below the upper surface of the top deck. The discoidal member has a nether surface within the well. The discoidal member is fitted with a blade adjacent to the rim of the disc and adapted to produce an accentuated reduction of pressure between the nether surface and the floor of the well. The labyrinth is positioned on the end of the blade at the rim of the discoidal member. This labyrinth member is for sealing the area between the nether surface and the floor of the well. The labyrinth member comprises a plurality of separated rimmed cavities extending outwardly from the rim of the discoidal member so as to be in very close proximity to the wall of the well.

The air intake system comprises a plurality of vent members extending across the center of the discoidal member so as to draw air through the center of the discoidal member during the rotation of the discoidal member. The vent members extend outwardly radially from the center of this discoidal member. The vent members have a curved downwardly spiralling configuration.

The prime mover provides powered rotation to the discoidal member. The prime mover is positioned within the fluid passageway or connected via mechanical transmission and has a spindle connected to the center of the discoidal member. The spindle is rotatable with respect to the prime mover. The present invention further comprises a second discoidal member positioned within the fluid passageway at a location adjacent to the bottom of the well. The second discoidal member is coaxial with the first discoidal member and connected by a common spindle. The second discoidal member also has a labyrinth on the periphery of the second discoidal member for restricting the clearance between the second discoidal member and the wall of the fluid passageway. This labyrinth comprises a plurality of rimmed cavities extending outwardly from the rim of the second discoidal member. The labyrinth of the second discoidal member serves to seal the area between the nether surface of the first discoidal member and the floor of the well from the fluid passageway. The second discoidal member also has a plurality of vents formed therein for passing air to the fluid passageway.

DETAILED DESCRIPTION OF THE INVENTION

Figure 1:
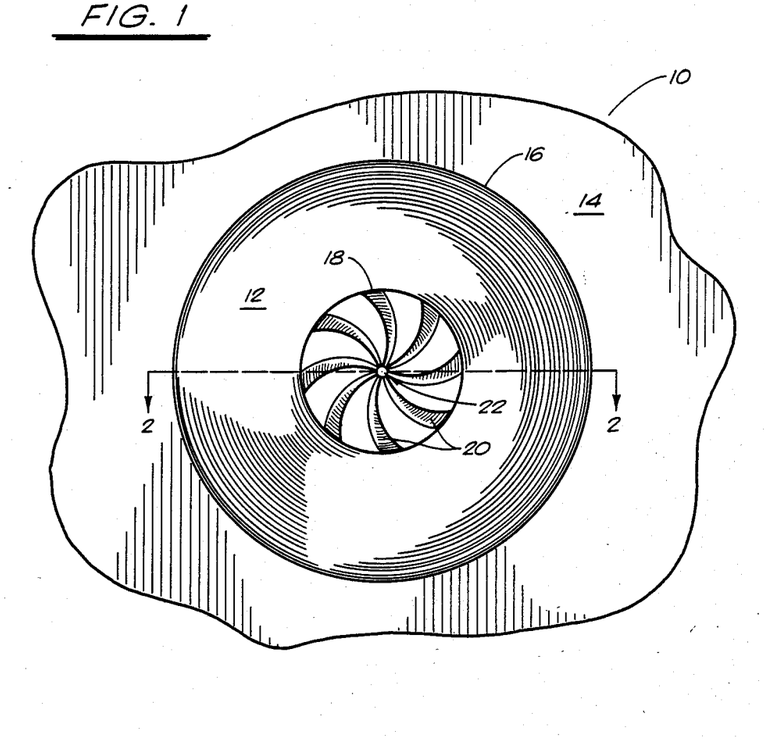
FIG. 1 shows a top view of the top of an aircraft incorporating the lift mechanism of the present invention.

Referring to FIG. 1, thereshown a top view of the aircraft lift mechanism 10 in accordance with the preferred embodiment of the present invention. In FIG. 1, the discoidal member 12 is shown in its position on a cut-away view of the top deck 14 of a flying vehicle. The discoidal member 12 is fit into a cylindrical well 16 formed in the top deck 14. The discoidal member 12 is adapted and powered for rotating within well 16. An air intake system 18 is formed in the center of the discoidal member 12. This air intake system 18 is for drawing air through the discoidal member 12 for use elsewhere is the flying vehicle 14. The air intake system 18 includes a plurality of vent members 20 that extend across the center of the discoidal member 10. The vent member serve to draw air through the center 18 of the discoidal member 12 during the rotation of the discoidal member 12 within well 16. Vent members 20 extend radially outward from the center spindle 22 of discoidal member 12. These vent members 20 have a generally curved, downwardly spiralling configuration. Spindle 22 is powered by a prime mover so as to cause the rotation of discoidal member 12.

Figure 2:
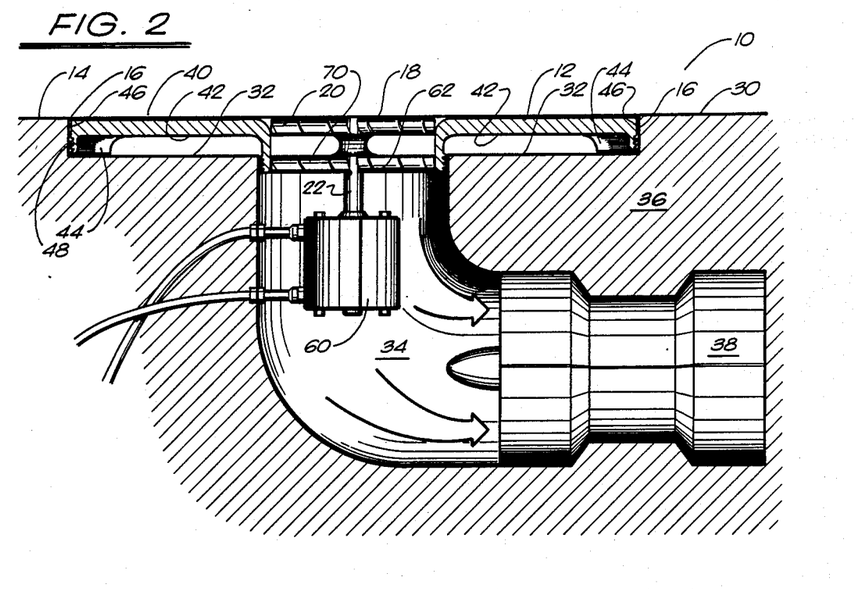
FIG. 2 is a cross-sectional view take across lines 2—2 of FIG. 1 showing the aircraft lift mechanism of the present invention.

FIG. 2 shows a cross section of the aircraft lift mechanism 10 as taken across line 2—2 of FIG. 1. In particular, FIG. 2 shows the top deck 14 of a flying vehicle, cylindrical well 16, the air intake system 18, discoidal member 12, and spindle 22. It can be seen that the top deck 14 has a generally flat exterior surface 30. The cylindrical well 16 is formed in the area of that flat surface. Cylindrical well 16 has a floor 32 that is generally flat. A fluid passageway 34 extends through the interior 36 of the flying vehicle. Fluid passageway 34 serves to pass air from the air intake system 18 through the interior 36 of the aircraft. The fluid passageway 34 is generally tubular and opens at the bottom 32 of cylindrical well 16. The fluid passageway 34 is arranged within the vehicle 36 so as to transmit air to turbine 38. Turbine 38 is connected to the fluid passageway 34 at the end of the fluid passageway 34 opposite the floor 32 of cylindrical well 16. Turbine 38 is positioned for providing forward thrust to the flying vehicle. Turbine 38 has a longitudinal axis that is offset by ninety degrees from the axis of the cylindrical well 16. As air passes into the air intake system 18 it travels through fluid passageway 34 and is received by turbine 38. Turbine 38 then can produce forward thrust for the aircraft 36.

Discoidal member 12 has a flat top service 40 that is generally parallel to the flat surface 30 of top deck 14 of the flying vehicle. The top surface 40 of the discoidal member 12 is position within well 16 below the upper surface 30 of the top deck 14. Discoidal member 12 has a nether surface 42 within the well 16. Nether surface 42 generally faces the floor 32 of cylindrical well 16. Nether surface 42 is fitted with blades 44 adjacent the rim 46 of the discoidal member 12. These blades are adapted to produce an accentuated reduction of pressure between the nether surface 42 and the floor 32 of cylindrical well 16 during the rotation of the discoidal member. Blades 44 are fitted to discoidal member 12 with minimum clearance above the floor 32. A labyrinth member 48 is formed on the periphery 46 of the discoidal member 12 for restricting the clearance between the discoidal member 12 and the wall 16 of the cylindrical well. In operation, labyrinth member 48 seals the area between the nether surface 42 and the floor 32 of the cylindrical well 16.

Figure 3:
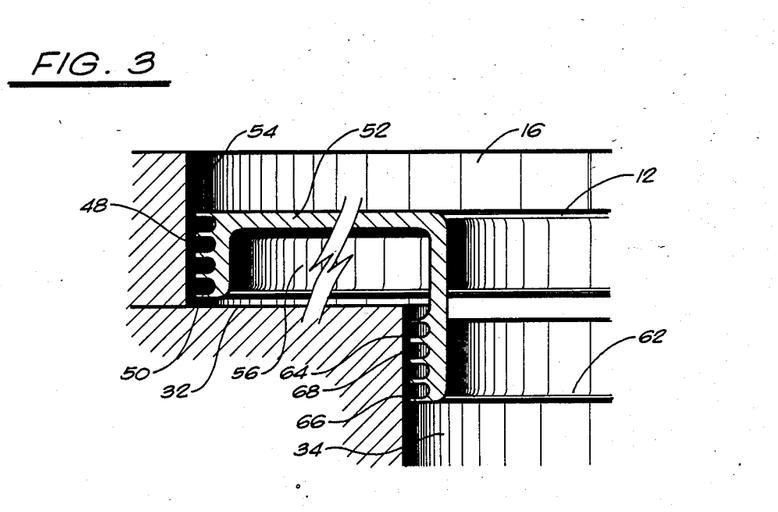
FIG. 3 is a close up view showing the labyrinth system of the present invention.

Referring to FIG. 3, labyrinth 48 comprises a plurality of rimmed cavities 50 that extend outwardly from the rim 52 of the discoidal member 12. The rimmed cavities 50 of the labyrinth are arranged so as to be in close proximity to the wall 54 of cylindrical well 16. The labyrinth 48 on the edge of the discoidal member 12 serves to suppress airflow within the vacuum cavity 56.

The present invention is particularly adapted so as to include the air intake system. The air intake system 18 allows airflow to pass to the turbine 38 and thus allow forward thrust of the aircraft. Because of the inclusion of the air intake system 18, various other components are required than those which are specified, claimed, or realized in the prior U.S. Pat. No. 4,202,518. These components, and arrangement thereof are described hereinafter.

As can be seen in FIG. 2, the vent members 20 extend across the center 18 of discoidal member 12. These vent members 20 are configured so as to draw air into the center of the discoidal member 12 during the rotation of the discoidal member. Vent members 20 have a curved configuration so as to "pump" into the fluid passageway 34.

Discoidal member 12 is rotated by spindle 22. Spindle 22, and is rotational movement are actuated by prime mover 60. Prime mover 60 may be a motor, it can be powered by hydraulic fluid, electricity, or actuated by the pressure of air on fans in the main turbine. The major requirement of prime mover 60 is that it have sufficient capacity to rotate discoidal member to a desired rate. As shown in FIG. 2, the prime mover 60 is positioned within the fluid passageway 34.

Importantly, a second discoidal member 62 is positioned within the fluid passageway 34 at a location adjacent to the floor 32 of cylindrical well 16. Second discoidal member 62 is coaxial with the first discoidal member 12. The second discoidal member shares a common spindle 22 with the first discoidal member 12. As such, the rotation of the second discoidal member 62 will coincide with the rotation of the first discoidal member 12.

Referring to FIG. 3, the second discoidal member 62 has a labyrinth 64 formed on the periphery of the second discoidal member 62. Labyrinth 64 restricts the clearance between the second discoidal member 62 and the wall 66 of the fluid passageway 34. Labyrinth 64 has a plurality of rimmed cavities 68 that extend outwardly from the rim of the second discoidal member 62. Rimmed cavities 68 are in close proximity to the wall 66 of fluid passageway 34. These rimmed cavities 68 are also in close proximity to the floor 32 of the cylindrical well 16. Labyrinth 64 of the second discoidal member 62 serves to seal the area between the nether surface 42, the floor 32 of the cylindrical well 16, from the fluid passageway 34. In comparison with prior Patent No. 4,202,518, the inclusion of fluid passageway 34 requires this labyrinth sealing mechanism. This labyrinth is included to suppress airflow in the vacuum cavity 56.

Second discoidal member 62 also includes plurality of vents 70. Vents 70 are formed therein for passing air to the fluid passageway 34. These vents 70 should have a configuration similar to those of the vents 20 on the first discoidal member. In other words, these vents assist in the drawing of air through the air intake system 18 into the fluid passageway. The second discoidal member 62 has a smaller diameter than the first discoidal member 12.

Figure 4:
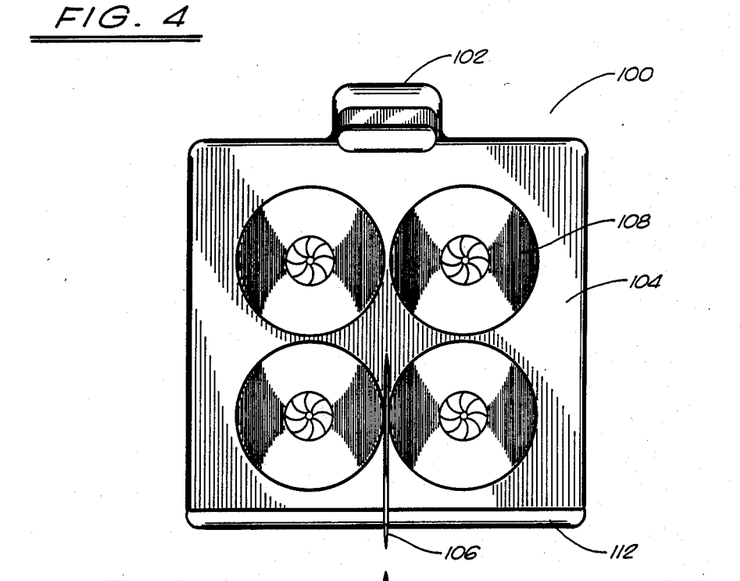
FIG. 4 is a top view of an aircraft incorporating the lift mechanism of the present invention.
Figure 5:
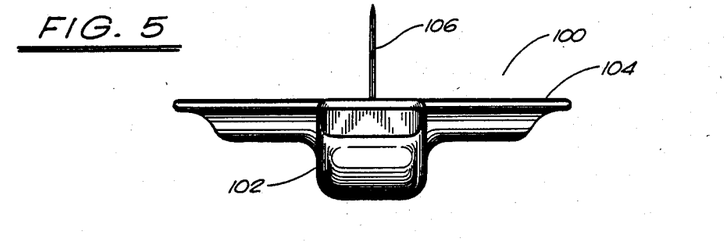
FIG. 5 is a frontal view of an aircraft incorporating the lift mechanism of the present invention.
Figure 6:
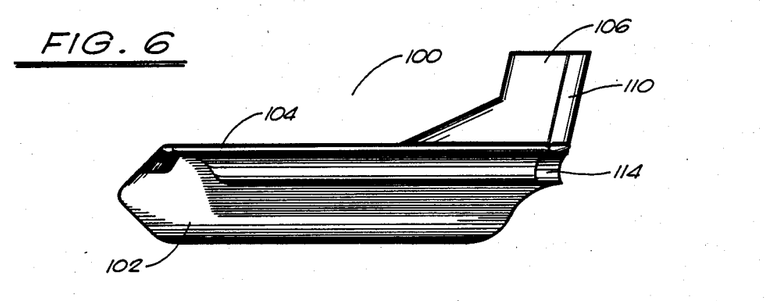
FIG. 6 is a view, inside elevation, of an aircraft incorporating the lift mechanism of the present invention.

FIGS. 4–6 illustrates the aircraft mechanism 10 as used on aircraft. As shown in FIG. 4, the flying vehicle 100 has a body 102, a top deck 104, and a tail section 106. The aircraft lift mechanism 108 is formed on the flat top deck 104. The flat top deck 104 is connected to the body 102. As shown in FIG. 4, the aircraft 100 includes four of the aircraft lift mechanisms 108. These lift mechanisms 108 are arranged in symmetrical fashion on the flat top deck 104. Flat top deck 104 forms the wings of the aircraft of the flying vehicle 102. Top deck 104 is relatively wide, optionally cambered over its length, of sufficient thickness to house the wells 16. The body 102 should have a sufficient size to include the fluid passageway, the associated turbins, and other mechanisms. The top deck 104 may overly or form the upper surface of the fuselage or cabin 102, with optional lateral overhang. Tail section 106 is an outboard longitudinal vertical vein providing anti-yaw stability. Tail section 106 is provided with rudder 110 at its aft end for added directional control and stability. Rudder 110 attached to tail section 106 may be coordinated for use with an articulated stabilizer or elevator member 112 forming the aft end of top deck 104. Elevator member 112 lies athwart it in the horizontal plane and serves to give the aircraft attitude control at speed. Turbine 114 is located at the aft end of the aircraft 100 for providing propulsion and thrust to the aircraft. If needed, additional jets or turbins may be included to provide additional thrust. As described previously, the air intake mechanism serves to provide the air to the turbins 114.

Body 102 may include the suitable crew compartment, control systems, fuel tanks, and other mechanisms required for flight.

Figure 7:
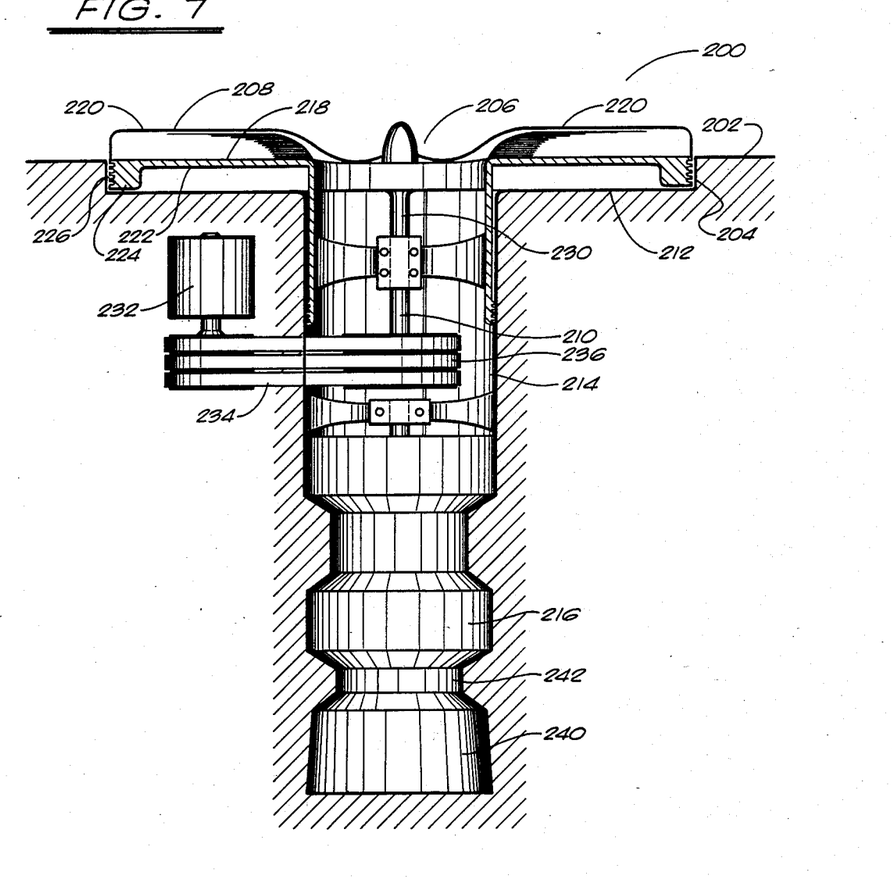
FIG. 7 is a cross-sectional view of an alternative embodiment of the present invention.

FIG. 7 illustrates an alternative embodiment of the invention. In particular, the configuration of FIG. 7 is a modification of the design illustrated in FIG. 2. FIG. 7 shows aircraft lift mechanism 200 taken in cross-section. FIG. 7 shows top deck 202 of a flying vehicle, cylindrical well 204, air intake system 206, discoidal member 208, and spindle 210. As before, the top deck 202 has a generally flat exterior surface. The cylindrical well 204 is formed in an area of that flat surface. Cylindrical well 204 has a floor 212 that is generally flat. A fluid passageway 214 extends through the interior of the flying vehicle. Fluid passageway 214 passes air from the air intake system 206 through the interior of the aircraft. The fluid passageway 214 is generally tubular and opens at the bottom 212 of the cylindrical well 204. The fluid passageway 214 is arranged within the vehicle so as to transmit air to turbine 216. Turbine 216 is connected to the fluid passageway 214 at the end of the fluid passageway 214 opposite the floor 212 of the cylindrical well 204. Turbine 216 is positioned for providing upward thrust to the flying vehicle. Turbine 216 has a longitudinal axis that is aligned with the longitudinal axis of fluid passageway 214. As air enters into the air intake system 206, the air travels through fluid passageway 214 and is received by turbine 216. Turbine 216 can then convert this fluid flow into upward or angular thrust for the flying vehicle.

Discoidal member 208 has a generally flat surface 218 that is generally parallel to the flat surface 202 of the top deck of the flying vehicle. The top surface 218 of the discoidal member 204 is positioned within well 204 below the upper surface 202 of the top deck. A plurality of protrusions 220 extend upwardly above this flat surface 218 and are configured for the purpose of increasing lift for the vehicle. Discoidal member 218 has a nether surface 222 within the well 204. Nether surface 222 generally faces the floor 212 of the cylindrical well 204. Nether surface 222 is fitted with blades 224 adjacent the rim 226 of discoidal member 218. These blades 224 are adapted to produce an accentuated reduction of pressure between the nether surface 222 and the floor 212 of cylindrical well 204 during the rotation of the discoidal member 208. As with the previous embodiment, suitable labyrinth members are formed at the periphery of the periphery member 208 for restricting the clearance between the discoidal member 208 and the wall of the cylindrical well 204.

Discoidal member 208 is rotated by spindle 230. Spindle 230 and its rotational movement are actuated by prime mover 232 by way of a plurality of belts, chains, or gears 234. The prime mover 232 may be a motor. This motor 232 can be powered by hydraulic fluid, electricity, or actuated by the pressure of air on fans in the main turbine. The prime mover 232 interacts with a suitable gearing arrangement 236 positioned within the fluid passageway 214.

It should be noted, that with the alternative embodiment indicated in FIG. 7, the nozzle 240 may be a directional nozzle. In other words, this nozzle can be rotated or oriented to give direction to the aircraft. A suitable rotational mechanism 242 may be included with the aircraft and with the turbine system so as to provide this directional approach.

Operation of the present invention is related to the Bernoulli proposition that a surface in motion relative to an air mass experiences reduced pressure. A reduced pressure of a rotating disc upper surface 12 is opposed by a normal ambient air pressure applied upwardly to the subjacent underbody of the aircraft, with subsequent net lift effect. Where rotating upper surface 40 of discoidal member 12 is exposed directly to stationary superjacent air, the upward movement is measurable and increase with an increase in the speed of rotation of discoidal member 12. The closely and circling wall of well 16 contributes to an effective containment of pressure difference. The concomitant reduce the pressure in the area 56 between the nether surface 42 of discoidal member 12 and the floor 32 of well 16 cause the application of a substantial part of the total lift action as "suction" or differential pressure bearing upward on the aircraft body structure subjacent to well bottom. This minimizes the spindle load.

Comparatively little of the lift effect is carried as a tensile load by the spindle 22. The lowered pressure operative over the discoidal member 12 is offset by lowered pressure operative in the clearance space 56 which separates the nether face 42 from the floor 32 of well 16. When the latter pressure drop is greater, spindle 22 carries a compressive stress instead of tensile. The partial vacuum distribution in clearance space 56 is unlike that above the discoidal member 12. This is in major contrast with the helicopter spindle, which must bear the entire lift effort and various other stresses.

The reduced air pressure effective upon the well bottom 32 is opposed by full ambient air pressure acting upwardly on the corresponding subjacent portion of the aircraft structure. Thus, the lift effort is applied directly to the aircraft structure. The same observation applies to reduced pressure prevailing over top deck 104, opposed by full ambient pressure upward on the respective aircraft underbody area 102. This is in major contrast with use of airfoils on standard airplanes.

An airfoil is, by definition in its own terms, a blade (foil) or member which passes through the atmosphere and which produces differential effects in the air as between its upper and its under surface, generally to produce lift or thrust. By contrast, discoidal member 12 is ensconced away from the free flow of the air, and only one of its surface even communicates therewith. Another outstanding difference between an air foil and the discoidal structure of the present invention is that the conventional airfoil produces a downward thrust to pond the air beneath it, or in the equivalent direction when the airfoil is in other than a horizontal position. The discoidal member of the present invention, in contrast thereto, produces no downward thrust upon the subjacent air. The present invention is not comparable to a helicopter rotor, as the discoidal structure of the aircraft lift mechanism of the present invention produces a considerably greater lift in pounds per horsepower without depending on ground effect and without stirring up the dust. The discoidal member 12 cannot have a stagnation point or a trailing edge vortex since, unlike airfoils, it has no air mass split ahead, part passing underneath, and both parts rejoining behind it.

The present invention will provide better aircraft performance that is afforded in the present state of the art. Air vehicles incorporating this invention will have equal cruising speed and range as their counterparts of the present time. Since the present invention is wingless, it will experience less drag, require less horsepower, and less fuel. It should also have greater payload capability. The ability to take off and land vertically provides many advances. The present invention will not depend upon ever more costly airports built far from the cities that they serve. Instead, the present invention can use midtown terminals, or any suitable platform or clearing. They will have increased safety as well as greater versatility and usefulness. Specialized types of the present invention will also become useful in the fight against fires, in personal transportation, and in other aircraft applications. Personalized air transport will enable millions to use the air independently. Numerous field of application outside of aviation will also benefit from the practice of the present invention.

The embodiments as illustrated and discussed in this specification are intended only to teach those skilled in the art the best way known by the inventor to make and use the invention. Nothing in the specification should be considered as limiting the scope of the present invention. Many changes could be made by those skilled in the art to produce equivalent systems without departing from the invention. The present invention should only be limited by the following claims and their legal equivalents.

I claim:

1. An apparatus for producing lift for a flying vehicle comprising:

a top deck of a flying vehicle having a cylindrical well formed thereinto;

a discoidal member positioned within said cylindrical well, said discoidal member adapted and powered for rotating within said well;

air intake means formed in the center of said discoidal member, said air intake means for drawing air through said discoidal member for use elsewhere in said flying vehicle; and a labyrinth member formed on the periphery of said discoidal member for restricting the clearance between said discoidal member and the wall of said cylindrical well.

2. The apparatus of claim 1, said top deck having a generally flat exterior surface, said cylindrical well formed in the area of said flat surface.

3. The apparatus of claim 1, further comprising:
a fluid passageway extending through the interior of said flying vehicle for passing said air from said air intake means, said fluid passageway opening at the bottom of said well.

4. The apparatus of claim 3, said fluid passageway arranged within said flying vehicle so as to transmit said air to a turbine said turbine positioned at the end of said fluid passageway opposite said cylindrical well.

5. The apparatus of claim 4, said turbine positioned for providing forward thrust to said flying vehicle, said turbine having an axis offset by ninety degrees from the axis of said well.

6. The apparatus of claim 4, said turbine positioned for providing upward thrust to said flying vehicle, said turbine having an axis aligned with the axis of said well.

7. The apparatus of claim 1, said discoidal member having a flat top surface generally parallel to said top deck of said flying vehicle, said top surface of said discoidal member positioned within said well below the upper surface of said top deck.

8. The apparatus of claim 1, said discoidal member having a nether surface within said well fitted with a blade adjacent the rim of said disc adapted to produce an accentuated reduction of pressure between said nether surface and the floor of said well.

9. The apparatus of claim 8, said labyrinth member positioned on the end of said blade at the rim of said discoidal member, said labyrinth member for sealing the area between said nether surface and the floor of said well.

10. The apparatus of claim 9, said labyrinth member comprising a plurality of rimmed cavities extending outwardly from the rim of said discoidal member so as to be in close proximity to said wall of said well.

11. The apparatus of claim 1, said air intake means comprising:
a plurality of vent members extending across the center of said discoidal member so as to draw air through the center of said discoidal member during rotation of said discoidal member.

12. The apparatus of claim 11, said vent members extending radially outwardly from the center of said discoidal member, said vent members having a curved downwardly spiralling configuration.

13. The apparatus of claim 3, further comprising:
prime mover means for providing powered rotation to said discoidal member, said prime mover means positioned within said fluid passageway and having a spindle connected to the center of said discoidal member, said spindle rotatable with respect to said prime mover means.

14. The apparatus of claim 3, further comprising:
a second discoidal member positioned within said fluid passageway at a location adjacent the bottom of said well, said second discoidal member being coaxial with said first discoidal member.

15. The apparatus of claim 14, said second discoidal member having a labyrinth on the periphery of said second discoidal member for restricting the clearance between said second discoidal member and the wall of said fluid passageway.

16. The apparatus of claim 15, said labyrinth of said second discoidal member comprising a plurality of rimmed cavities extending outwardly from the rim of said second discoidal member so as to be in close proximity to the wall of said fluid passageway adjacent the bottom of said well.

17. The apparatus of claim 16, said labyrinth of said second discoidal member for sealing the area between a nether surface of said first discoidal member and the floor of said well from said fluid passageway.

18. The apparatus of claim 14, said second discoidal member having a plurality of vents formed therein for passing air to said fluid passageway, said second discoidal member having a smaller diameter than said first discoidal member, said second discoidal member and said first discoidal member powered by a primer mover means.

19. A flying vehicle comprising:
a generally flat top deck connected to a body, said top deck forming the wings of said flying vehicle;

a tail section connected to said top deck for stabilizing and controlling aircraft attitude;

a discoidal member positioned in a cylindrical well formed in said top deck, said discoidal member adapted and powered for rotating within said well, said discoidal member rotating with restricted clearance from the wall of said cylindrical well;

air intake means formed in the central portion of said discoidal member for drawing air into and through said discoidal member; and thruster means connected to said body for providing forward movement to said flying vehicle, said thruster means communicating with said air intake means by way of a fluid passageway.

20. The vehicle of claim 19, said thruster means being a turbine having an inlet opening to the end of said fluid passageway opposite said air intake means, said discoidal member having a nether surface within said well fitted with a blade adjacent the rim of said discoidal member adapted to produce an accentuated reduction of pressure between said nether surface and the floor of said well, said air intake means comprising a plurality of vent members extending across the center of said discoidal member so as to draw air through the center of said discoidal member during rotation of said discoidal member, said flying vehicle further comprising:
a second discoidal member positioned within said fluid passageway at a location adjacent the bottom of said well, said second discoidal member being coaxial with said first discoidal member, said first discoidal member and said second discoidal member connected by a common spindle, said second discoidal member having a plurality of vents formed therein for passing air to said fluid passageway, said second discoidal member having a smaller diameter than said first discoidal member, said spindle being powered for rotation by a prime mover means so as to impart rotation to said first and second discoidal members.

21. The flying vehicle of claim 20, further comprising:
a labyrinth member formed on the periphery of said first discoidal member for restricting the clearance between said discoidal member and the wall of said cylindrical well, said labyrinth member positioned on the end of said blade at the rim of said discoidal member, said labyrinth member sealing the area between said nether surface and the floor of said well, said second discoidal member having a labyrinth on the periphery of said second discoidal member for restricting the clearance between said second discoidal member and the wall of said fluid passageway, said labyrinth of said second discoidal member for sealing the area between said nether surface of said first discoidal member and the floor of said well from said fluid passageway.

* * * * *